(12) United States Patent
Katsumata

(10) Patent No.: US 9,673,642 B2
(45) Date of Patent: Jun. 6, 2017

(54) DISCHARGE CONTROL DEVICE, DISCHARGE CONTROL METHOD AND COMPUTER READABLE MEDIUM

(71) Applicant: GS Yuasa International Ltd., Kyoto (JP)

(72) Inventor: Yutaro Katsumata, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 312 days.

(21) Appl. No.: 14/325,883

(22) Filed: Jul. 8, 2014

(65) Prior Publication Data

US 2015/0015208 A1  Jan. 15, 2015

(30) Foreign Application Priority Data

Jul. 12, 2013  (JP) ................. 2013-146980

(51) Int. Cl.
*H02J 7/00* (2006.01)
*B60L 3/04* (2006.01)

(52) U.S. Cl.
CPC .............. *H02J 7/0029* (2013.01); *B60L 3/04* (2013.01); *H02J 7/0063* (2013.01); *H02J 2007/0067* (2013.01)

(58) Field of Classification Search
CPC .... H02J 7/0029; H02J 2007/0067; B60L 3/04
USPC ........................................................ 320/136
See application file for complete search history.

(56) References Cited

U.S. PATENT DOCUMENTS

| 8,455,123 | B2 | 6/2013 | Ryu et al. |
| 2004/0160045 | A1 | 8/2004 | Miura |
| 2006/0137929 | A1 * | 6/2006 | Yoshida ................ B60K 6/48 180/279 |
| 2007/0023215 | A1 | 2/2007 | Ueda |
| 2007/0072060 | A1 * | 3/2007 | Chang ................. H01M 10/443 429/62 |
| 2009/0317665 | A1 | 12/2009 | Maeng et al. |
| 2012/0029083 | A1 | 2/2012 | Finkelstein et al. |
| 2013/0033914 | A1 | 2/2013 | Tsuji |
| 2014/0368031 | A1 | 12/2014 | Schmidt |

FOREIGN PATENT DOCUMENTS

| DE | 102011088973 A1 | 6/2013 |
| JP | 4-188573 | 7/1992 |
| JP | 2004129367 A2 | 4/2004 |
| JP | 2004-148864 | 5/2004 |
| JP | 200520952 | 1/2005 |

(Continued)

OTHER PUBLICATIONS

Extended European Search Report dated Sep. 30, 2015 issued in the corresponding European patent application No. 14176111.4.

*Primary Examiner* — Richard Isla Rodas
*Assistant Examiner* — David V Henze-Gongola
(74) *Attorney, Agent, or Firm* — Rankin, Hill & Clark LLP

(57) ABSTRACT

A discharge control device for controlling discharge in an energy storage device disposed in an electric apparatus, wherein the discharge control device includes a first determination unit adapted to determine whether or not an electric apparatus's status is being outside a predetermined first range and a discharge controller adapted to start discharge in the energy storage device, when the first determination unit determines that the status of the electric apparatus is being outside the first range.

18 Claims, 11 Drawing Sheets

(56) References Cited

FOREIGN PATENT DOCUMENTS

| | | | |
|---|---|---|---|
| JP | 2006143141 A2 | 6/2006 | |
| JP | 2006224772 A2 | 8/2006 | |
| JP | 2008-27889 | 2/2008 | |
| JP | 2009-87723 | 4/2009 | |
| JP | 2010-3690 | 1/2010 | |
| JP | 2010515406 | 5/2010 | |
| JP | 2011-503185 | 1/2011 | |
| JP | 2011-217544 | 10/2011 | |
| JP | 2012-65503 | 3/2012 | |
| JP | WO 2013057571 A2 * | 4/2013 | ................ B60L 3/04 |
| WO | 2013057571 A2 | 4/2013 | |

* cited by examiner

DISCHARGE CONTROL DEVICE, DISCHARGE CONTROL METHOD AND COMPUTER READABLE MEDIUM

CROSS-REFERENCE TO RELATED APPLICATIONS

This application claims the benefit of Japanese patent application No. 2013-146980, filed on Jul. 12, 2013, which is incorporated by reference.

FIELD

The present invention relates to a discharge control device, a discharge control method and a computer readable medium for controlling discharge in energy storage devices which are incorporated in an electric apparatus such as a moving body.

BACKGROUND

Energy storage devices, such as lithium ion secondary batteries, have been used as power supplies in mobile apparatuses such as notebook PCs and cellular phones. Further, in recent years, such energy storage devices have been used in a wide variety of fields including power supplies for moving bodies such as electric vehicles. If such energy storage devices are brought into overheated states, due to damage and the like in these energy storage devices caused when energy storage devices are used in unexpected usage forms and usage states, their characteristics are degraded or energy storage devices are not capable of properly being charged and properly discharging electricity.

Therefore, conventionally, there have been proposed techniques for preventing overheating in such energy storage devices (refer to JP-A-2010-3690, for example). According to these techniques, an electrical short-circuit is caused between an electrode and a can for discharging an electric current through the can, thereby preventing the overheating in an energy storage device.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

According to the present invention, there is provided a novel technique for suppressing overheating in energy storage devices.

According to an aspect of the present invention, there is provided a discharge control device for controlling discharge in an energy storage device disposed in an electric apparatus, wherein the discharge control device includes: a first determination unit adapted to determine whether or not an electric apparatus's status is being outside a predetermined first range; and a discharge controller adapted to start discharge in the energy storage device, when the first determination unit determines that the status of the electric apparatus is being outside the first range.

BRIEF DESCRIPTION OF THE DRAWINGS

The foregoing and other features of the present invention will become apparent from the following description and drawings of an illustrative embodiment of the invention in which.

DESCRIPTION OF EMBODIMENTS

Figure 1:
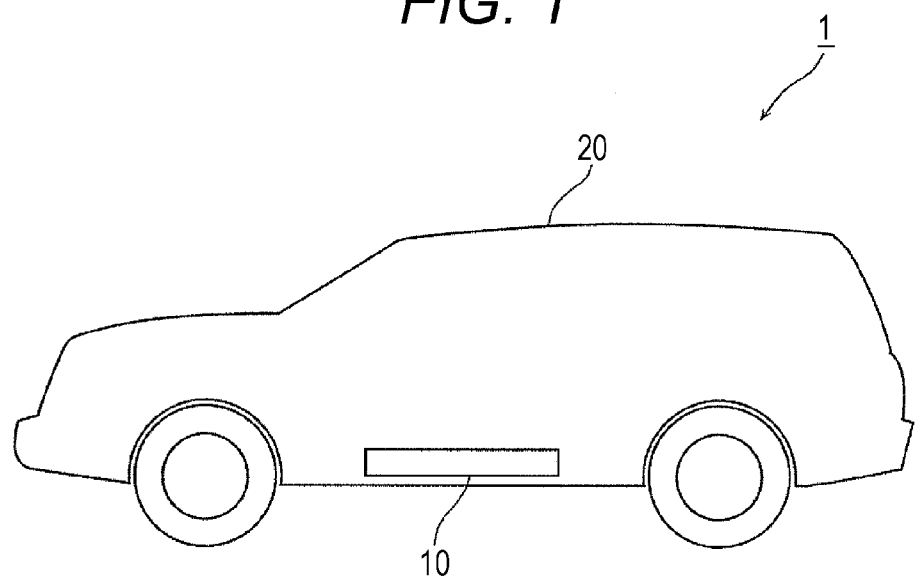
FIG. 1 is a view illustrating a moving body according to an embodiment of the present invention.

According to an aspect of the present invention, there is provided a discharge control device for controlling discharge in an energy storage device disposed in an electric apparatus, wherein the discharge control device includes: a first determination unit adapted to determine whether or not an electric apparatus's status is being outside a predetermined first range; and a discharge controller adapted to start discharge in the energy storage device, when the first determination unit determines that the status of the electric apparatus is being outside the first range.

According to this aspect, the discharge control device starts discharge in the energy storage device, in the case where the electric apparatus's status gets out of the predetermined range. Once the electric apparatus's status is out of the first range, then the electric apparatus's status may be back within the first range or may be further deviated from the first range. Namely, the discharge control device determines the status of the electric apparatus and starts discharge in the energy storage device, prior to the actual occurrence of such a status that the status of the usage of the electric apparatus is further deviated from the predetermined range (for example, a traffic accident such as a collision of the moving body with an object). Therefore, even in the event of damage of a mechanism for suppressing overheating in the energy storage device, it is possible to continuously perform discharge in the energy storage device, thereby suppressing the overheating in the energy storage device, since the discharge in the energy storage device has been started prior to the occurrence of such a traffic accident and the like.

Further, the discharge control device may further include a second determination unit adapted to determine whether or not an the electric apparatus's status is within a predetermined second range, after the discharge controller starts the discharge in the energy storage device, wherein the discharge controller may be adapted to stop the discharge in the energy storage device, when the second determination unit determines that the electric apparatus's status is within the second range.

According to this aspect, the discharge control device stops the discharge in the energy storage device, when the result of the determination by the second determination unit is within the predetermined second range, after the start of the discharge in the energy storage device. Namely, even when the discharge control device has started the discharge in the energy storage device through the determination of the electric apparatus's status, if the status of the usage of the electric apparatus falls within the predetermined second range thereafter, the discharge control device ends the discharge in the energy storage device and restores it to a normal state as that before the first determination. Thus, the discharge control device can suppress the unnecessary continuation of the discharge in the energy storage device.

Further, the discharge control device may further include a receiving unit adapted to receive a discharge stop command which is a command for stopping discharge in the energy storage device, wherein the discharge controller may be adapted to stop the discharge in the energy storage device, when the discharge stop command has been received, after the start of the discharge in the energy storage device.

According to this aspect, the discharge control device stops the discharge in the energy storage device, if a command for stopping the discharge in the energy storage device has been received, after the start of the discharge in the energy storage device. Namely, even when the discharge control device has started the discharge in the energy storage device through the determination of the electric apparatus's status, if a command for stopping the discharge in the energy storage device is received from a user and the like, for the reason that there is no need for discharge or for other reasons, the discharge control device ends the discharge in the energy storage device and restores it to the previous normal state. Thus, the discharge control device can suppress the unnecessary continuation of the discharge in the energy storage device.

Further, when the energy storage device is incorporated in a moving body which is supplied with electric power from the energy storage device, the first determination unit may be adapted to determine a status of the moving body, by detecting an acceleration of the moving body.

According to this aspect, the discharge control device can determine the status of the moving body from the change and the like of the value of the acceleration, by detecting the acceleration of the moving body.

Further, the first determination unit may be adapted to determine that the electric apparatus's status is being outside the first range, when the acceleration of the moving body is equal to or less than a predetermined first threshold value.

According to this aspect, the discharge control device determines that the status of the usage of the moving body will be deviated from the predetermined range, when it determines that the acceleration of the moving body is equal to or less than the predetermined first threshold value. Namely, when the acceleration is equal to or less than the first threshold value, the discharge control device can determine that hard braking has been exerted on the moving body. Therefore, the discharge control device can sense the possibility of the occurrence of a traffic accident and the like in advance. As described above, the discharge control device can determine the status of the moving body, by comparing the acceleration with the first threshold value. Therefore, the discharge control device can suppress the overheating in the energy storage device more simply.

Further, the predetermined first threshold value may be set to fall within the range of −2 G to −0.7 G.

According to this aspect, the discharge control device can determine that hard braking has been exerted on the moving body, by using the threshold value having a value which exceeds levels in the event of hard braking expected to occur during normal running but does not reach levels in the event of collisions. Thus, the discharge control device can sense the possibility of the occurrence of a traffic accident and the like more certainly, in advance.

Further, the discharge control device may further include an acceleration sensor adapted to detect the acceleration of the moving body.

According to this aspect, the discharge control device can easily detect the acceleration of the moving body with the acceleration sensor and, thus, can determine the status of the moving body more simply.

Further, the second determination unit may be adapted to determine the electric apparatus's status, by detecting a degree of a shock.

According to this aspect, the discharge control device can simply determine the electric apparatus's status from the change and the like of the degree of the shock, by detecting the degree of the shock.

Further, the second determination unit may be adapted to determine that the electric apparatus's status is within the second range, when the degree of the shock is less than a predetermined second threshold value.

According to this aspect, the discharge control device determines that the status of the usage of the electric apparatus is within the predetermined range and stops the discharge in the energy storage device, if the degree of the shock is smaller than the second threshold value. When the degree of the shock is equal to or more than the second threshold value, the discharge control device determines that a collision with an object has occurred and continues the discharge in the energy storage device. Thus, the discharge control device can simply determine the electric apparatus's status, by comparing the degree of the shock with the second threshold value.

When the energy storage device is incorporated in a moving body which is supplied with electric power from the energy storage device, the shock may be a shock exerted on the moving body.

According to this aspect, the discharge control device detects the shock exerted on the moving body and, therefore, can simply determine the status of the moving body, from the change of the degree of the shock and the like.

Further, the discharge control device may further include a shock sensor adapted to detect the degree of the shock.

According to this aspect, the discharge control device can easily detect the degree of the shock with the shock sensor and, thus, can determine the status of the moving body more simply.

Further, the present invention can be realized not only as the discharge control device for controlling the discharge in the energy storage device, but also as an energy storage system including an energy storage device and a discharge control device for controlling discharge in the energy storage device. The energy storage device incorporated in the energy storage system can be a nonaqueous electrolyte secondary battery. Further, the present invention can be realized as a moving body such as an electric vehicle including this energy storage system. Further, the present invention can be realized as a discharge control method including steps of characteristic processes to be performed by the discharge control device. Further, the present invention can be realized as an integrated circuit including characteristic processing portions which are incorporated in the discharge control device. Also, the present invention can be realized as programs which cause a computer to execute characteristic processes included in the discharge control method. Also, the present invention can be realized as recording media, such as computer readable CD-ROMs (Compact Disc-Read Only Memories) which store these programs. Further, it goes without saying that such programs can be distributed through recording media such as CD-ROMs and transfer media such as the Internet.

Further, the electric apparatus which incorporates the discharge control device according to the present invention can be any of apparatuses which are supplied with electric power from energy storage devices, such as moving bodies such as electric vehicles, stationary electric storage systems such as emergency power supply devices.

According to the aspects of the present invention, even when the electric apparatus such as a moving body is used in forms which are deviated from ranges of usually-expected usage forms (for example, in the event of destruction of a mechanism for suppressing overheating in the energy storage devices, due to a collision of the moving body with an object, for example), it is possible to suppress the overheating in the energy storage devices.

Hereinafter, with reference to the drawings, there will be described a discharge control device, and a moving body including the discharge control device according to embodiments of the present invention. The embodiments which will be described below all indicate preferable examples of the present invention. Numerical values, shapes, materials, constituents, placement, positions and connection states of constituents, steps, orders of steps and the like which will be described in the following embodiments are merely illustrative and are not intended to restrict the present invention. Further, out of the constituents in the following embodiments, the constituents which are not described in the independent claims indicating the most generic concept of the present invention are described as arbitrary constituents which form more preferable modes.

(Embodiments)

At first, the structure of an energy storage system 10 will be described.

FIG. 1 is a view illustrating a moving body 1 according to an embodiment of the present invention. Further, FIG. 2 is an external view of the energy storage system 10 including a discharge control device 100 according to an embodiment of the present invention.

As illustrated in FIG. 1, the moving body 1 is a moving body which includes the energy storage system 10 including the discharge control device 100 which will be described below and, further, includes a vehicle main body 20 housing the energy storage system 10. Namely, the moving body 1 is an electric vehicle, such as an electric vehicle (EV), a hybrid electric vehicle (HEV), and a plug-in hybrid electric vehicle which are adapted to travel using the energy storage system 10 as a power supply. The moving body 1 includes the energy storage system 10 at a center portion of the bottom portion of the vehicle main body 20.

The position at which the energy storage system 10 is placed is not limited to the center portion of the bottom portion of the vehicle main body 20, and the energy storage system 10 can be placed in a front portion (an anterior part), a rear portion (a posterior part) and the like of the vehicle main body 20. Further, the moving body 1 can also include two or more energy storage systems 10. The moving body 1 can be a truck, a bus or a two-wheeled vehicle, as well as a passenger vehicle such as that in the same figure and, also, the moving body 1 can be a moving body in any of other forms, provided that the moving body includes the energy storage system 10 and is movable.

Figure 2:
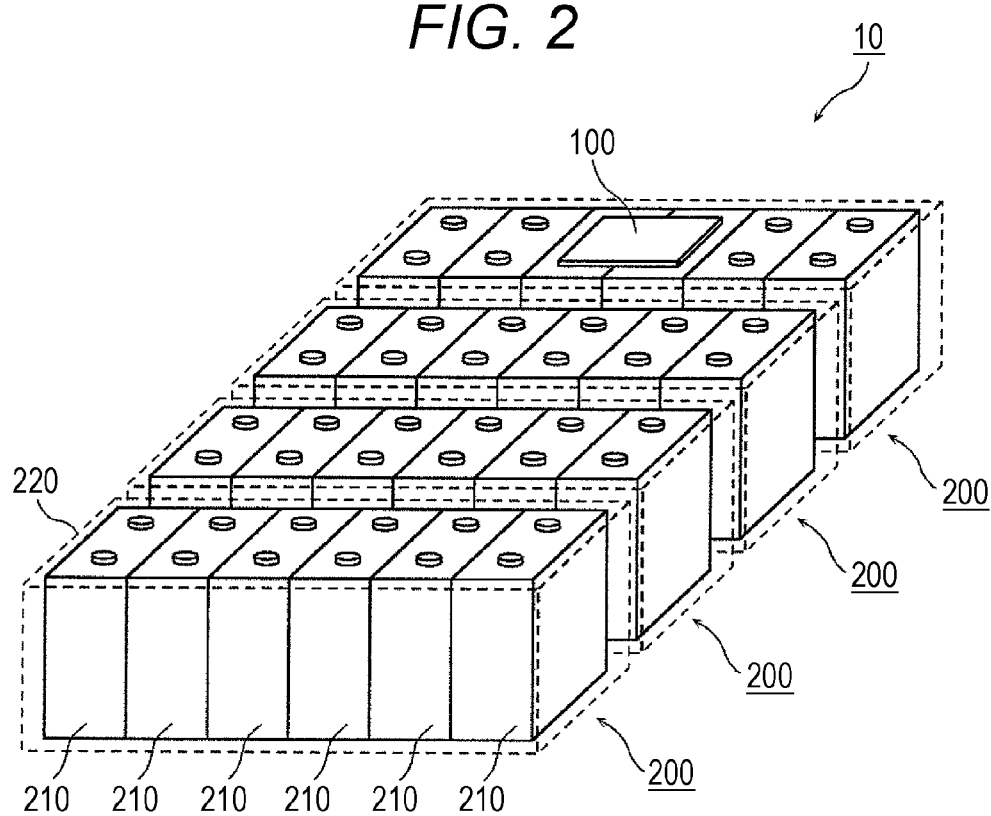
FIG. 2 is an external view of an energy storage system including a discharge control device according to an embodiment of the present invention.

As illustrated in FIG. 2, the energy storage system 10 is an energy storage system (an assembled battery) which includes the discharge control device 100, and plural (four in FIG. 2) rectangular-shaped energy storage units 200. In FIG. 2, there are illustrated the insides of housing cases 220 for the energy storage units, in such a way as to perspectively view the housing cases 220. The energy storage system 10 also includes a case housing the discharge control device 100 and the plural energy storage units 200, but the case is not illustrated in the figure.

The discharge control device 100 has a circuit board which is placed above the energy storage unit 200 at an end portion, out of the plural energy storage units 200, and incorporates a circuit for controlling the discharge in the plural energy storage units 200. More specifically, the discharge control device 100 is connected to the plural energy storage units 200 and is adapted to acquire information from the plural energy storage units 200 and from the outside and, further, to control the discharge in the plural energy storage units 200.

Although the discharge control device 100 is placed above the energy storage unit 200 at the end portion, out of the plural energy storage units 200, the discharge control device 100 can be placed at any position. The discharge control device 100 will be described below in detail with respect to its functions and structure.

The plural energy storage units 200 are arranged such that their longer side surfaces are faced to each other, and the respective energy storage units 200 are connected in parallel to each other. Although, in this case, there are provided the four energy storage units 200, it is possible to provide any number of energy storage units 200. Further, the shape of the energy storage units 200 is not particularly limited.

Each of the energy storage units 200 includes plural (six in FIG. 2) rectangular-shaped energy storage devices 210, and the housing case 220 which houses these plural energy storage devices 210. The plural energy storage devices 210 are arranged such that their longer side surfaces are faced to each other, and the energy storage devices 210 are connected in series to each other. The number of the energy storage devices 210 is not limited to six and can be also any other plural numbers or can be one. Further, the shape of the energy storage devices 210 is not particularly limited.

Figure 3:
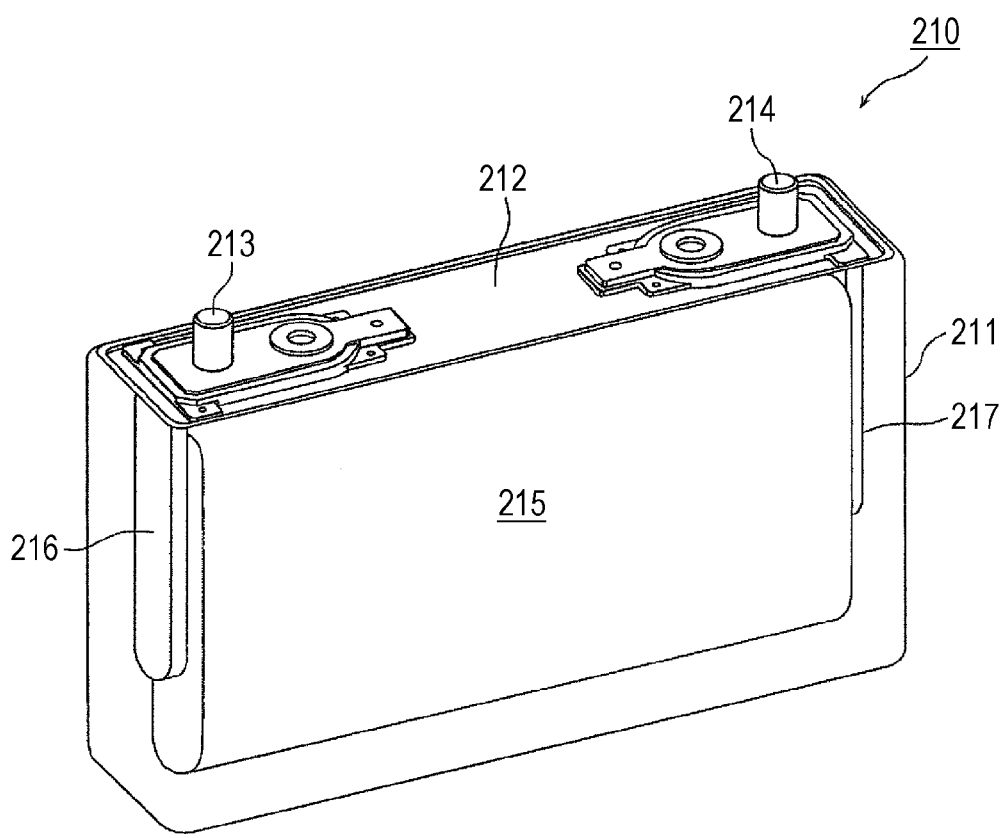
FIG. 3 is a perspective view illustrating the inside of an energy storage device.

Hereinafter, the structure of the energy storage devices 210 will be described in detail. FIG. 3 is a perspective view illustrating the inside of an energy storage device 210.

Each energy storage device 210 is a secondary battery which is capable of charging electricity therein and also is capable of discharging electricity therefrom and, more specifically, is a nonaqueous electrolyte secondary battery such as a lithium ion secondary battery. Each energy storage device 210 is not limited to such a nonaqueous electrolyte secondary battery and, also, can be a secondary battery other than a nonaqueous electrolyte secondary battery or can be a capacitor.

As illustrated in FIG. 3, the energy storage device 210 includes a container 211, a positive-electrode terminal 213 and a negative-electrode terminal 214, and the container 211 includes a lid member 212 which forms its upper wall. Inside the container 211, there are placed an electrode body 215, a positive-electrode current collector 216, and a negative-electrode current-collector 217. Further, the container 211 interiorly encloses a liquid such as an electrolyte solution, but this liquid is not illustrated in the figure.

The container 211 is constituted by a main body which is made of a metal and has a rectangular tubular shape with a bottom, and the lid member 212 which is made of a metal and is adapted to close an opening of the main body. The container 211 is enabled to seal the inside thereof, by bonding the lid member 212 to the main body through welding and the like, after housing the electrode body 215 and the like therein.

The electrode body 215 is a power generating element which includes a positive electrode, a negative electrode and a separator and is capable of storing electricity. More specifically, the electrode body 215 is a wound-type electrode body which is formed from the positive electrode, the negative electrode and the separator which are placed in a layer shape such that the separator is sandwiched between the positive electrode and the negative electrode, wherein their entirety is wound into an ellipsoidal shape. The electrode body 215 can be also a layer-laminated type electrode body which is formed from flat-plate-shaped electrode plates laminated on each other.

The positive electrode is an electrode plate constituted by a positive-electrode current collection film with an elongated-strip shape and conductivity which is made of aluminum or an aluminum alloy, and a positive active material layer formed on a surface of the positive-electrode current collection film. The negative electrode is an electrode plate constituted by a negative-electrode current collection film with an elongated-strip shape and conductivity which is made of copper or a copper alloy, and a negative active material layer formed on a surface of the negative-electrode current collection film. The separator is a microporous sheet.

The positive electrode, the negative electrode and the separator which are used in the energy storage devices 210 are not particularly different at all from those which have been conventionally used, and it is also possible to employ any well-known materials which do not degrade the performance of the energy storage devices 210. Further, the electrolyte solution (the nonaqueous electrolyte solution) which is enclosed in the container 211 is not particularly limited in terms of its type, and it is also possible to employ, thereas, various types of electrolyte solutions provided that they do not degrade the performance of the energy storage devices 210.

The positive-electrode terminal 213 is an electrode terminal which is electrically connected to the positive electrode in the electrode body 215 through the positive-electrode current collector 216. The negative-electrode terminal 214 is an electrode terminal which is electrically connected to the negative electrode in the electrode body 215 through the negative-electrode current collector 217. The positive-electrode terminal 213 and the negative-electrode terminal 214 are both mounted to the lid member 212. Namely, the positive-electrode terminal 213 and the negative-electrode terminal 214 are metal electrode terminals for extracting the electricity stored in the electrode body 215 to a space outside the energy storage device 210 and, also, for introducing electricity into an internal space within the energy storage device 210 for storing electricity in the electrode body 215.

The positive-electrode current collector 216 is a member with conductivity and rigidity which is placed between the positive electrode in the electrode body 215 and a side wall of the container 211 and, further, is electrically connected to the positive electrode and to the positive-electrode terminal 213. The positive-electrode current collector 216 is made of aluminum, similarly to the positive-electrode current collection film in the positive electrode. The negative-electrode current collector 217 is a member with conductivity and rigidity which is placed between the negative electrode in the electrode body 215 and a side wall of the container 211 and, further, is electrically connected to the negative-electrode terminal 214 and to the negative electrode in the electrode body 215. The negative-electrode current collector 217 is made of copper, similarly to the negative-electrode current collection film in the negative electrode.

Figure 4:
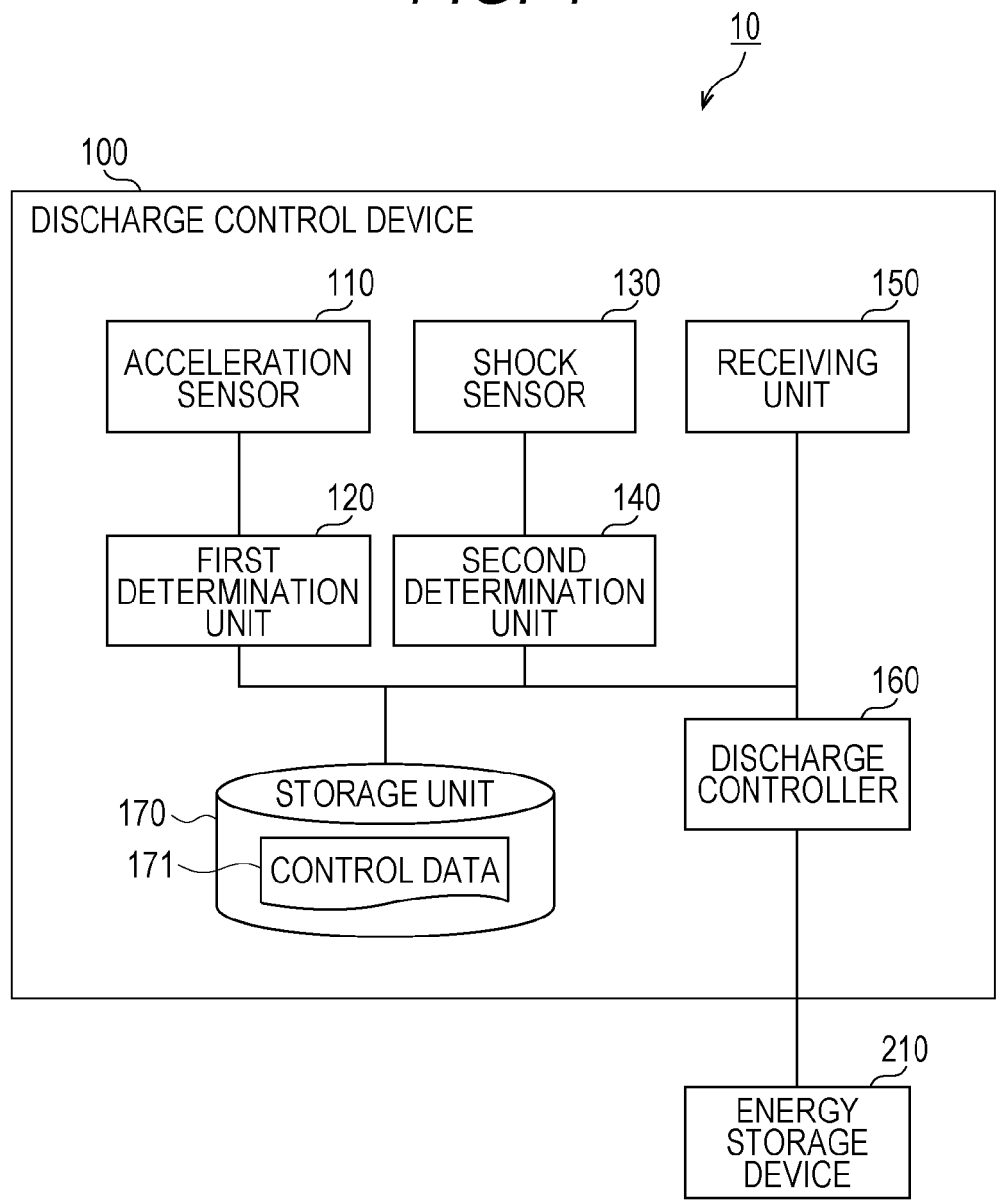
FIG. 4 is a block diagram illustrating the structure of the discharge control device according to the embodiment of the present invention.

Next, the discharge control device 100 will be described in detail, with respect to the structure thereof. FIG. 4 is a block diagram illustrating the structure of the discharge control device 100 according to the embodiment of the present invention.

The discharge control device 100 is a device adapted to control the discharge in the energy storage devices 210 included in the plural energy storage units 200 which are connected in parallel to each other. As illustrated in FIG. 4, the discharge control device 100 includes an acceleration sensor 110, a first determination unit 120, a shock sensor 130, a second determination unit 140, a receiving unit 150, a discharge controller 160, and a storage unit 170.

The storage unit 170 is a memory which stores control data 171 for use in controlling the discharge in the energy storage devices 210 included in the energy storage units 200. The control data 171 is an aggregation of information necessary for controlling the discharge in the energy storage devices 210, and a first threshold value and a second threshold value, which will be described later, are stored therein, for example.

The acceleration sensor 110 detects the acceleration of the moving body 1. Namely, the acceleration sensor 110 detects a positive acceleration when the moving body 1 is being accelerated, and the acceleration sensor 110 detects a negative acceleration when the moving body 1 is being decelerated. The acceleration sensor 110 transmits the detected acceleration to the first determination unit 120.

The first determination unit 120 determines whether or not the status of running of the moving body 1 is being outside a predetermined first range. For example, the first determination unit 120 predicts whether or not any of accidents including collisions of the moving body 1 with objects will occur. In this case, "accidents" refer to phenomena which are likely to induce damages of the energy storage system 10 mounted in the moving body 1 and, thus, refer to phenomena which do not occur in normal usage states, such as collisions of the moving body 1 with other moving bodies or with other objects. Further, "accidents" also include shocks exerted on the discharge control device 100 or on the electric apparatus including the energy storage system 10, due to natural disasters such as earthquakes or due to falling objects or flying objects.

More specifically, the first determination unit 120 determines whether or not the moving body 1 is being in a normal usage state, by detecting the acceleration of the moving body 1. For example, the first determination unit 120 predicts whether or not an accident will occur to the moving body 1. More specifically, the first determination unit 120 determines whether or not the negative acceleration detected by the acceleration sensor 110 is equal to or less than the first threshold value. If the first determination unit 120 determines that this negative acceleration is equal to or less than the first threshold value, it predicts that an accident will occur to the moving body 1 and determines that the running status is being outside a normal usage range.

Namely, the first determination unit 120 acquires a negative acceleration from the acceleration sensor 110, when the moving body 1 is being decelerated. Further, the first determination unit 120 acquires the first threshold value stored in the control data 171, out of the control data 171 in the storage unit 170. Then, the first determination unit 120 determines whether or not the acquired negative acceleration is equal to or less than the first threshold value. If the first determination unit 120 determines that this negative acceleration is outside a first range (the negative acceleration is equal to or less than the first threshold value, for example), it predicts that an accident will occur to the moving body 1.

The first range or the first threshold value has been properly set according to usage states of the moving body 1 and has been preliminarily written and stored in the control data 171 in the storage unit 170. Preferably, the first range or the first threshold value is set to be a value which exceeds levels in the event of hard braking expected to occur during normal running but does not reach levels in the event of collisions. Namely, accelerations in the event of hard braking are about −1.1 to −0.7 G, and accelerations in the event of collisions are about −several tens of G. Therefore, this first threshold value is preferably set to be about −several G to about −a dozen G.

This first threshold value is more preferably set to be a value close to accelerations in the event of usual hard braking, which is about −1 G to −2 G. This is because, even if discharge in the energy storage devices 210 is started in an earlier stage, this discharge will be stopped, unless a collision occurs, as will be described later.

Also, the first determination unit 120 can be adapted to acquire this first threshold value, by calculating the first threshold value based on a predetermined rule, rather than by acquiring the first threshold value out of the control data 171.

The shock sensor 130 detects the degrees of shocks exerted on the moving body 1. Namely, if the moving body 1 undergoes a shock, the shock sensor 130 detects the degree of the shock. More specifically, if a collision of the moving body 1 with an object occurs, as an accident, the shock sensor 130 detects a large shock. Further, the shock sensor 130 transmits the detected degree of the shock to the second determination unit 140.

The second determination unit 140 further determines whether or not the status of the moving body 1 is falling within a predetermined second range, after the discharge controller 160, which will be described later, starts discharge in the energy storage devices 210. For example, the second determination unit 140 can determine whether or not an accident has occurred to the moving body 1. Namely, after the start of the discharge in the energy storage devices 210 based on the determination by the first determination unit 120, the second determination unit 140 further determines the status of the moving body 1. For example, the second determination unit 140 determines whether or not an accident has occurred to the moving body 1 and, thus, can determine whether or not it is falling within a normal usage range.

More specifically, the second determination unit 140 detects the degree of shock exerted on the moving body 1, in order to determine whether or not an accident has occurred to the moving body 1. More specifically, the second determination unit 140 makes a comparison as to whether the degree of the shock detected by the shock sensor 130 is smaller than the predetermined second threshold value. If the second determination unit 140 determines that the degree of the shock is smaller than the second threshold value, it stops the discharge in the energy storage devices.

Namely, if the moving body 1 undergoes a shock, the second determination unit 140 detects the degree of the shock exerted on the moving body 1, from the shock sensor 130. Further, the second determination unit 140 acquires the second threshold value stored in the control data 171, out of the control data 171 in the storage unit 170. Further, the second determination unit 140 compares the acquired degree of the shock with the second threshold value. If the second determination unit 140 determines that this degree of the shock is equal to or more than the second threshold value, it determines that an accident has occurred to the moving body 1 and continues the discharge.

This second threshold value has been properly set according to usage states of the moving body 1 and, further, has been preliminarily written and stored in the control data 171 in the storage unit 170. More specifically, the second threshold value is set according to the degrees of shocks which are expected to be exerted on the moving body 1 in the event of collisions of the moving body 1.

Preferably, this second threshold value is set to be a smaller value. This is for continuing the discharge in the energy storage devices 210 more certainly, in order to prevent the discharge in the energy storage devices 210 from being stopped in an early stage, as will be described later.

Also, the second determination unit 140 can be adapted to acquire this second threshold value, by calculating the second threshold value based on a predetermined rule, rather than by acquiring the second threshold value out of the control data 171.

The receiving unit 150 receives discharge stop commands which are commands for stopping discharge in the energy storage devices 210. More specifically, the receiving unit 150 receives such discharge stop commands, through commands from the outside which have been made by user's inputting manipulations. Upon receipt of a discharge stop command, the receiving unit 150 transmits the discharge stop command to the discharge controller 160. Also, the receiving unit 150 can be adapted to receive such discharge stop commands according to a predetermined rule, rather than through commands from the outside which have been made by user's inputting manipulations.

The discharge controller 160 starts discharge in the energy storage devices 210, if the first determination unit 120 predicts that an accident will occur to the moving body 1. Namely, the discharge controller 160 starts discharge in the energy storage devices 210, if the first determination unit 120 determines that the negative acceleration of the moving body 1 is equal to or less than the first threshold value and, thus, predicts that an accident will occur in the moving body 1.

Further, the discharge controller 160 stops the discharge in the energy storage devices 210, if the second determination unit 140 determines that no accident has occurred to the moving body 1. Namely, if the second determination unit 140 determines that the moving body 1 has not undergone a shock equal to or more than the second threshold value, and no accident has occurred to the moving body 1, within a certain time period after the start of the discharge in the energy storage devices 210, the discharge controller 160 stops the discharge in the energy storage devices 210. This certain time period, which is properly set according to usage states of the moving body 1, is a time period of about several seconds to several minutes, for example.

Further, if the receiving unit 150 receives a discharge stop command, after the start of the discharge in the energy storage devices 210, the discharge controller 160 stops the discharge in the energy storage devices 210. Namely, if the receiving unit 150 receives a discharge stop command, regardless of the result of the determination by the second determination unit 140 as to whether or not an accident has occurred, the discharge controller 160 stops the discharge in the energy storage devices 210.

The data stored in the storage unit 170 is not limited to that described above. Also, the discharge control device 100 can be adapted such that it does not include the storage unit 170, and the discharge control device 100 can be adapted to store data in an external apparatus and to acquire data from this external apparatus.

Next, there will be described a process with which the discharge control device 100 controls discharge in the energy storage devices 210.

Figure 5:
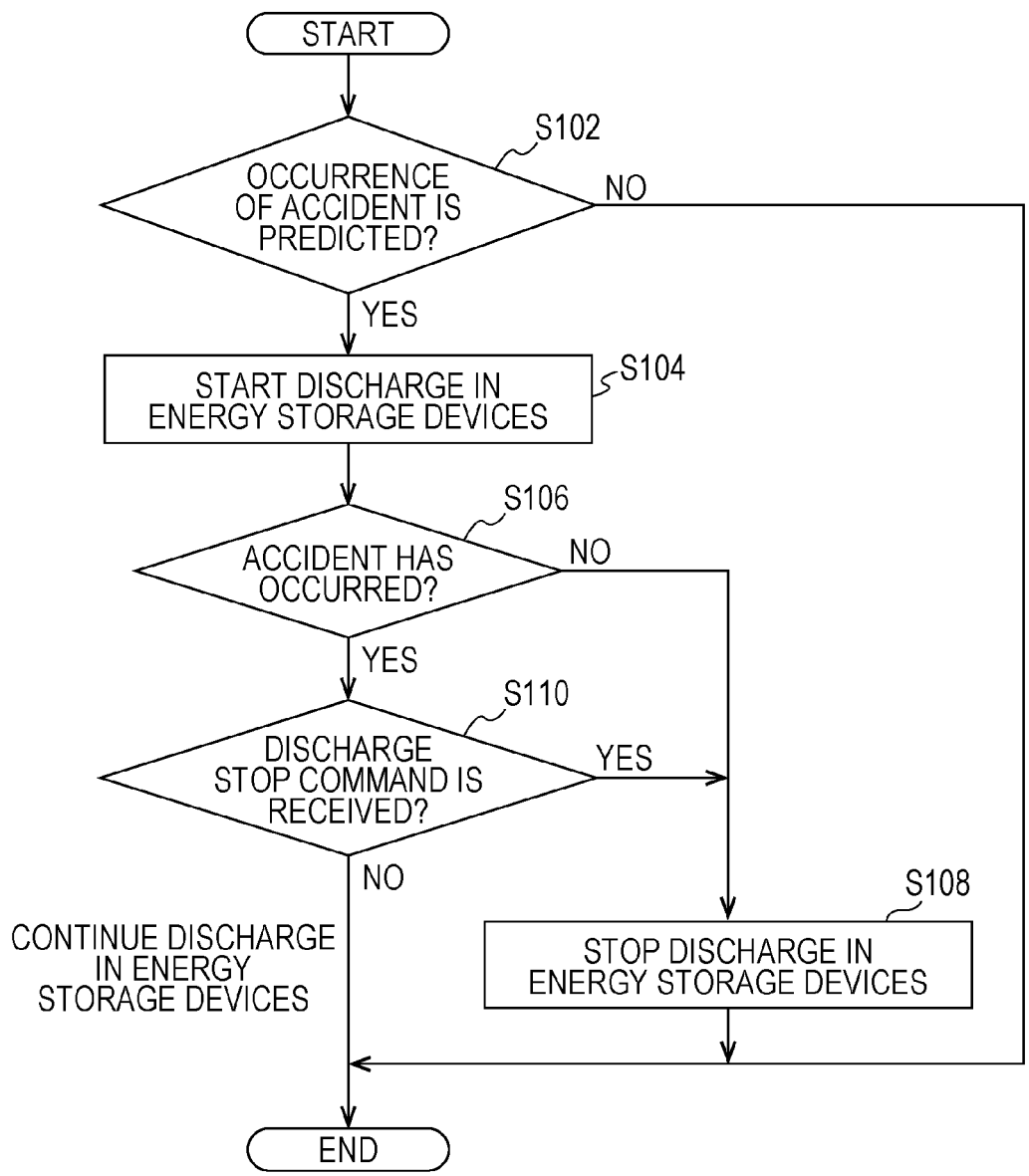
FIG. 5 is a flow chart illustrating an example of a process with which the discharge control device controls discharge in the energy storage devices.

FIG. 5 is a flow chart illustrating an example of the process with which the discharge control device 100 controls discharge in the energy storage devices 210.

As illustrated in FIG. 5, at first, the first determination unit 120 predicts whether or not any of accidents including collisions of the moving body 1 with objects will occur (S102). This process with which the first determination unit 120 predicts whether or not any of accidents will occur to the moving body 1 will be described later, in detail.

If the first determination unit 120 predicts that an accident will occur to the moving body 1 (Yes in S102), the discharge controller 160 starts discharge in the energy storage devices 210 (S104). If the first determination unit 120 predicts that no accident will occur to the moving body 1 (No in S102), the discharge controller 160 ends the process.

In the case where the discharge controller 160 has started the discharge in the energy storage devices 210 (S104), the second determination unit 140 determines whether or not an accident has occurred to the moving body (S106). The process with which the second determination unit 140 determines whether or not an accident has occurred to the moving body 1 will be described later in detail.

If the second determination unit 140 determines that no accident has occurred to the moving body 1 (No in S106), the discharge controller 160 stops the discharge in the energy storage devices 210 (S108) and ends the process.

If the second determination unit 140 determines that an accident has occurred to the moving body 1 (Yes in S106), the discharge controller 160 determines whether or not the receiving unit 150 has received a discharge stop command (S110).

If the discharge controller 160 determines that the receiving unit 150 has received a discharge stop command (Yes in S110), the discharge controller 160 stops the discharge in the energy storage devices 210 (S108) and ends the process. If the discharge controller 160 determines that the receiving unit 150 has received no discharge stop command (No in S110), the discharge controller 160 ends the process, while continuing the discharge in the energy storage devices 210.

As described above, the process with which the discharge control device 100 controls discharge in the energy storage devices 210 is completed.

Next, there will be described, in detail, the process with which the first determination unit 120 predicts whether or not any of accidents will occur to the moving body 1 (S102 in FIG. 5).

Figure 6:
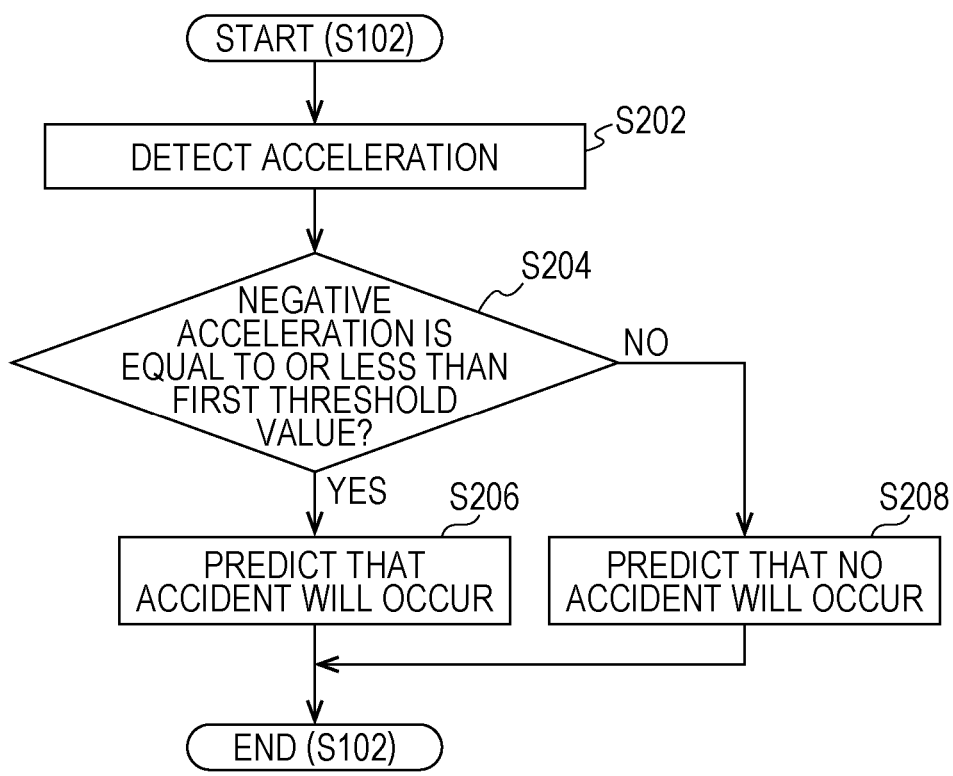
FIG. 6 is a flow chart illustrating an example of a process with which a first determination unit determines the status of a moving body.

FIG. 6 is a flow chart illustrating an example of the process with which the first determination unit 120 predicts whether or not any of accidents will occur to the moving body 1.

As illustrated in FIG. 6, the acceleration sensor 110 detects the acceleration of the moving body 1 (S202). More specifically, when the moving body 1 has been decelerated due to hard braking or the like, the acceleration sensor 110 detects a negative acceleration.

Further, the first determination unit 120 determines whether or not the negative acceleration detected by the acceleration sensor 110 is equal to or less than the predetermined first threshold value (S204).

If the first determination unit 120 determines that the negative acceleration detected by the acceleration sensor 110 is equal to or less than the predetermined first threshold value (Yes in S204), the first determination unit 120 predicts that an accident will occur to the moving body 1 (S206).

If the first determination unit 120 determines that the negative acceleration detected by the acceleration sensor 110 is not equal to or less than the predetermined first threshold value (No in S204), the first determination unit 120 predicts that no accident will occur to the moving body 1 (S208).

As described above, the process with which the first determination unit 120 predicts whether or not any of accidents will occur to the moving body 1 (S102 in FIG. 5) is completed.

Next, there will be described, in detail, the process with which the second determination unit 140 determines whether or not an accident has occurred to the moving body 1 (S106 in FIG. 5).

Figure 7:
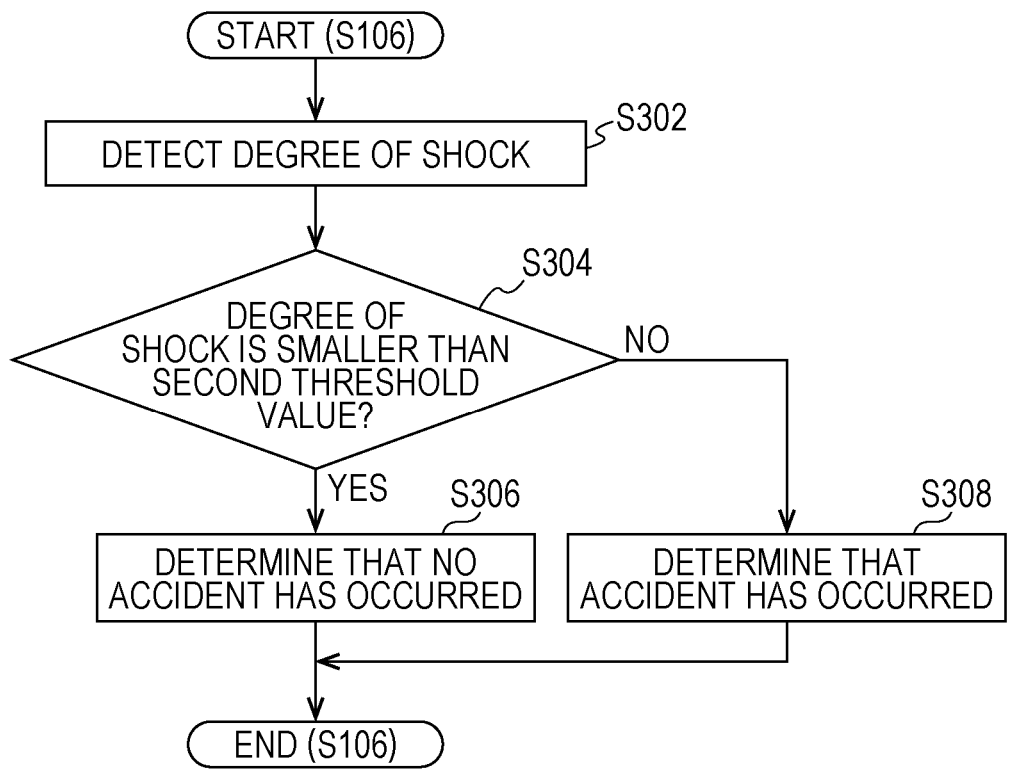
FIG. 7 is a flow chart illustrating an example of a process with which a second determination unit determines the status of the moving body.

FIG. 7 is a flow chart illustrating an example of the process with which the second determination unit 140 determines whether or not an accident has occurred to the moving body 1.

As illustrated in FIG. 7, the shock sensor 130 detects the degree of the shock exerted on the moving body 1 (S302). More specifically, if the moving body 1 undergoes a shock, the shock sensor 130 detects the degree of the shock exerted on the moving body 1.

The second determination unit 140 determines whether or not the degree of the shock detected by the shock sensor 130 is smaller than the predetermined second threshold value (S304).

If the second determination unit 140 determines that the degree of the shock detected by the shock sensor 130 is smaller than the second threshold value (Yes in S304), the second determination unit 140 determines that no accident has occurred to the moving body 1 (S306).

If the second determination unit 140 determines that the degree of the shock detected by the shock sensor 130 is not smaller than the second threshold value (the degree of the shock is equal to or more than the second threshold value) (No in S304), the second determination unit 140 determines that an accident has occurred to the moving body 1 (S308).

As described above, the process with which the second determination unit 140 determines whether or not an accident has occurred to the moving body 1 (S106 in FIG. 5) is completed.

As described above, the discharge control device 100 according to the embodiment of the present invention is adapted to start discharge in the energy storage devices 210, if it predicts that any of accidents including collisions of the moving body 1 with objects will occur. Namely, prior to the actual occurrence of an accident such as a collision of the moving body 1 with an object, the discharge control device 100 senses the occurrence of this accident and starts the discharge in the energy storage devices 210. Therefore, even in the event of destruction of a mechanism for suppressing overheating in the energy storage devices 201 due to the occurrence of this accident, it is possible to continuously perform discharge in the energy storage devices 210, thereby suppressing the overheating in the energy storage devices 210, since the discharge in the energy storage devices 210 has been started prior to the occurrence of this accident.

Further, the discharge control device 100 is adapted to detect the acceleration of the moving body 1 and, therefore, is enabled to predict whether or not an accident will occur to the moving body 1 from changes in the value of this acceleration, which makes it possible to suppress overheating easily in the energy storage devices 210.

Further, the discharge control device 100 predicts that an accident will occur to the moving body 1, if it determines that the negative acceleration detected by the acceleration sensor 110 is equal to or less than the predetermined first threshold value. Namely, when the negative acceleration is equal to or less than the first threshold value, the discharge control device 100 can determine that hard braking has been exerted on the moving body 1, in order to avoid the collision of the moving body 1 with an object. Therefore, in this case, the discharge control device 100 can sense the possibility of the occurrence of an accident to the moving body 1 in advance. As described above, the discharge control device 100 can predict whether or not an accident will occur to the moving body 1, by comparing the negative acceleration with the first threshold value. Therefore, the discharge control device 100 can suppress the overheating in the energy storage devices 210 more easily.

Further, if the discharge control device 100 determines that no accident has occurred to the moving body 1, after the start of the discharge in the energy storage devices 210, it stops the discharge in the energy storage devices 210. Namely, even in the case where the discharge control device 100 predicts that an accident will occur in the moving body 1 and starts discharge in the energy storage devices 210, if this accident has not occurred, the discharge control device 100 ends the discharge in the energy storage devices 210 and restores them to a normal state as that before the prediction of the occurrence of the accident. Thus, the discharge control device 100 can suppress the unnecessary continuation of the discharge in the energy storage devices 210.

Further, the discharge control device 100 is adapted to detect the degree of the shock exerted on the moving body 1 and, thus, is enabled to easily determine whether or not an accident has occurred to the moving body 1 from the change of the degree of this shock and the like.

Further, if the discharge control device 100 determines that the degree of the shock detected by the shock sensor 130 is equal to or more than the predetermined second threshold value, it determines that an accident has occurred to the moving body 1. Namely, if the degree of the shock is equal to or more than the second threshold value, the discharge control device 100 can determine that the moving body 1 has collided with an object. Therefore, in this case, the discharge control device 100 can determine that an accident has occurred to the moving body 1. Thus, the discharge control device 100 can easily determine that an accident has occurred to the moving body 1, by comparing the degree of the shock with the second threshold value.

Further, the discharge control device 100 is adapted to stop the discharge in the energy storage devices 210, if a command for stopping the discharge in the energy storage devices 210 is received, after the start of the discharge in the energy storage device 210. Namely, even in the case where the discharge control device 100 predicts that an accident will occur to the moving body 1 and starts discharge in the energy storage devices 210, if the discharge control device 100 receives a command for stopping the discharge in the energy storage devices 210 from the user and the like, for the reason that this accident has not occurred or for other reasons, the discharge control device 100 ends the discharge in the energy storage devices 210 and restores them to a normal state as that before the prediction of the occurrence of the accident. Thus, the discharge control device 100 can suppress the unnecessary continuation of the discharge in the energy storage devices 210.

(First Modification Example)

Figure 8:
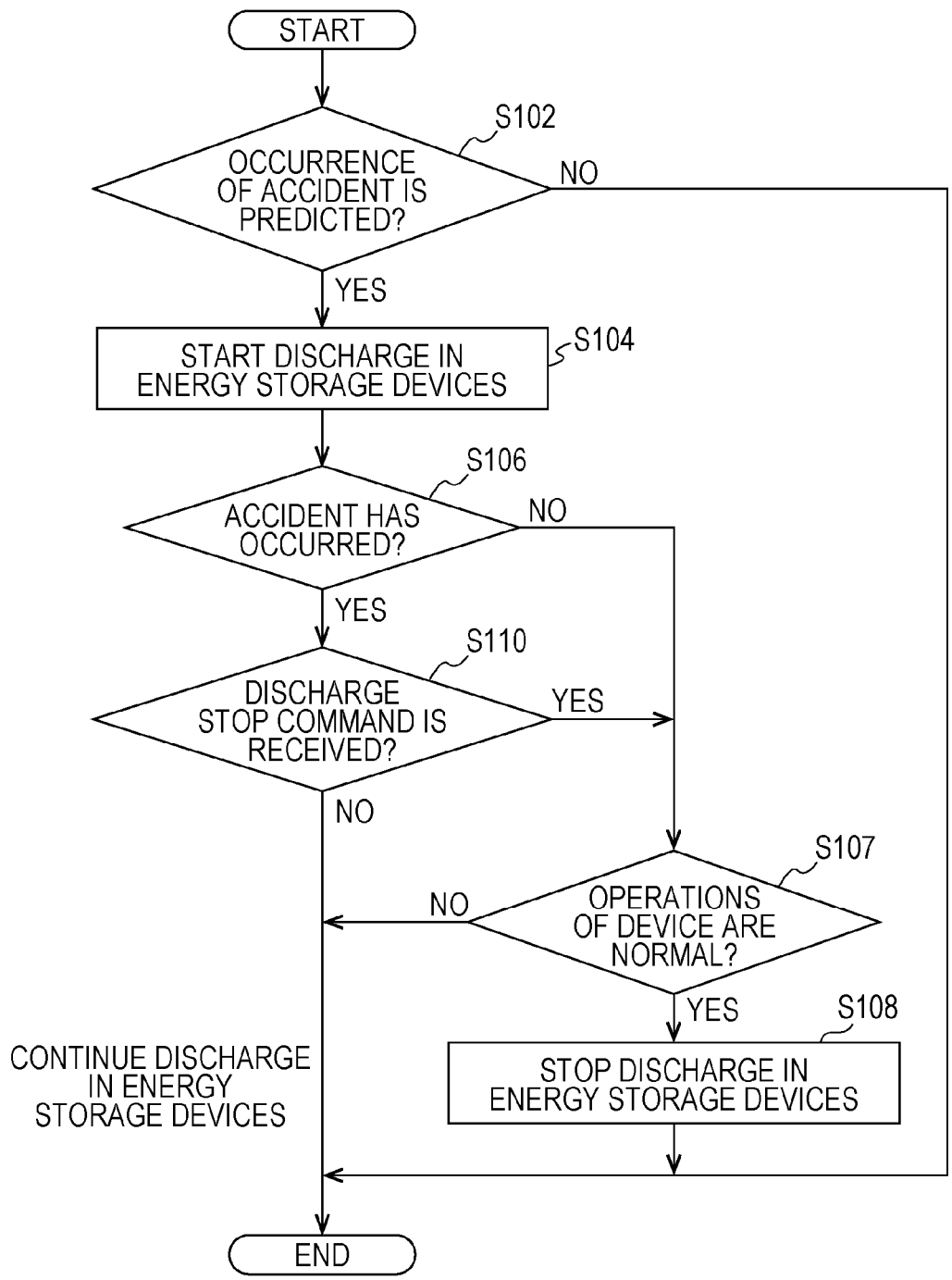
FIG. 8 is a flow chart illustrating an example of a process with which the discharge control device controls discharge in the energy storage devices.

Next, a first modification example of the aforementioned embodiment will be described. FIG. 8 is a flow chart illustrating an example of a process with which the discharge control device 100 controls discharge in the energy storage devices 210, according to the first modification example of the embodiment of the present invention.

As illustrated in FIG. 8, the process with which the second determination unit 140 determines whether or not an accident has occurred to the moving body 1 and the processes therebefore (S102 to S106) are the same as those in the aforementioned embodiment and, therefore, will not be described herein.

If the second determination unit 140 determines that no accident has occurred to the moving body 1 (No in Step 106) or if the discharge controller 160 determines that the receiving unit 150 has received a discharge stop command (Yes in Step 110), the discharge controller 160 determines whether or not the operations in respective units in the discharge control device 100 are normal (S107).

If the discharge controller 160 determines that the operations in the respective units in the discharge control device 100 are normal (Yes in S107), the discharge controller 160 stops the discharge in the energy storage devices 210 (S108). If the discharge controller 160 determines that the operations in the respective units in the discharge control device 100 are not being normal (No in S107), the discharge controller 160 ends the process while continuing the discharge in the energy storage devices 210.

The details of the other processes (S108 and S110) are the same as those in the aforementioned embodiment and, therefore, will not be described herein.

As described above, the discharge control device 100 according to the first modification example of the embodiment of the present invention is capable of continuing the discharge in the energy storage devices 210 without stopping the discharge in the energy storage devices 210, if it determines that the operations in the respective units in the discharge control device 100 are not normal. This can realize the discharge control device 100 which is capable of suppressing overheating in the energy storage devices more certainly.

(Second Modification Example)

Figure 9:
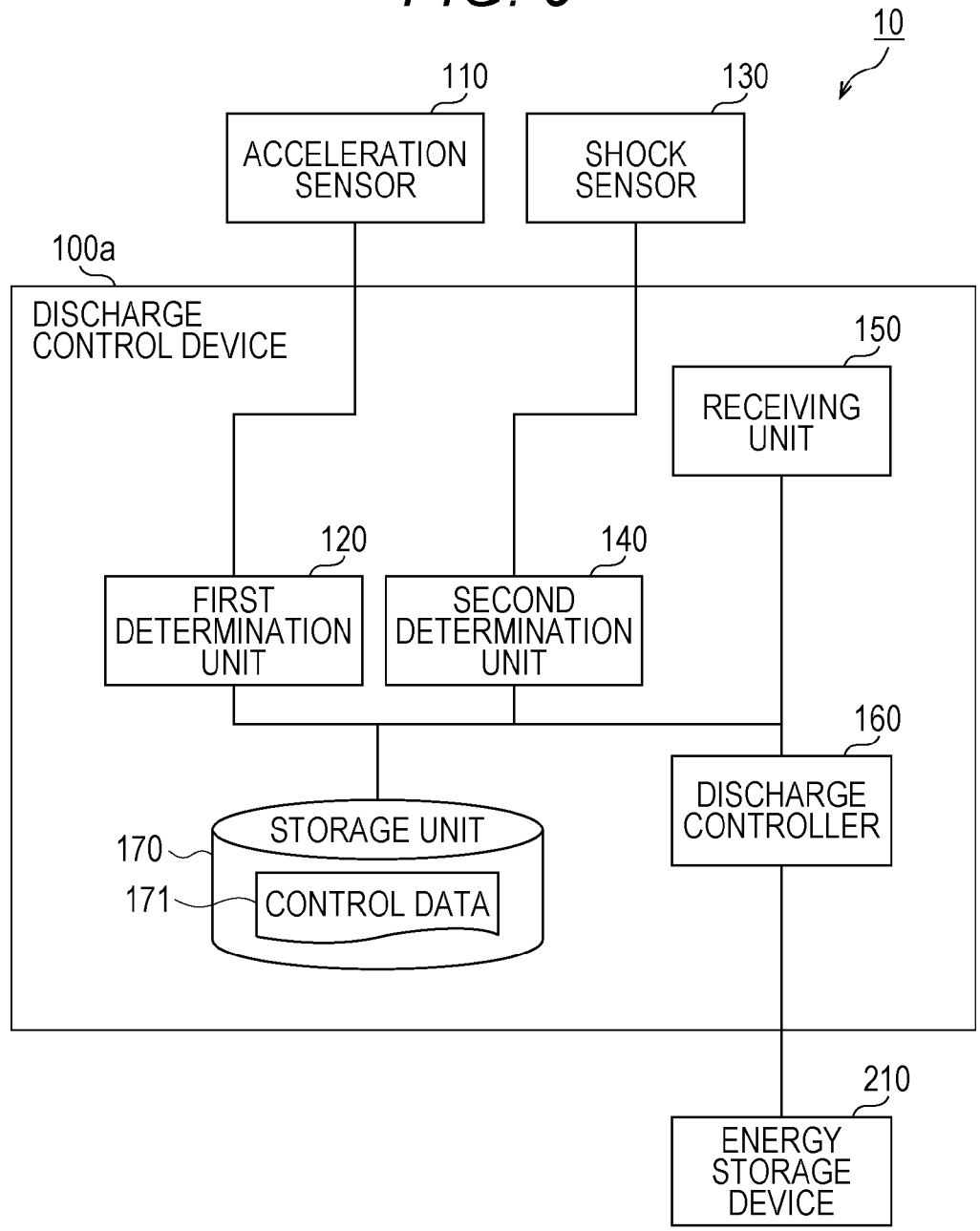
FIG. 9 is a block diagram illustrating the structure of a discharge control device according to a second modification example.

Next, a second modification example of the aforementioned embodiment will be described. FIG. 9 is a block diagram illustrating the structure of a discharge control device 100*a* according to the second modification example of the embodiment of the present invention.

As illustrated in FIG. 9, the discharge control device 100*a* does not include the acceleration sensor 110 and the shock sensor 130, unlike the discharge control device 100 according to the aforementioned embodiment. Namely, the discharge control device 100*a* is adapted to acquire information from an external acceleration sensor 110 and an external shock sensor 130 which are incorporated in the moving body 1, for controlling the discharge in the energy storage devices 210.

More specifically, the first determination unit 120 acquires a negative acceleration detected by the outside acceleration sensor 110 and, thus, determines whether or not this negative acceleration is equal to or less than a predetermined first threshold value. Further, the second determination unit 140 acquires the degree of shock detected by the outside shock sensor 130 and, thus, determines whether or not this degree of shock is equal to or less than a predetermined second threshold value.

As described above, the discharge control device 100*a* according to the second modification example of the embodiment of the present invention is adapted to acquire information from the external acceleration sensor 110 and the external shock sensor 130 which are incorporated in the moving body 1, although it does not include the acceleration sensor 110 and the shock sensor 130. This can provide the same effects as those of the aforementioned embodiment.

(Third Modification Example)

Figure 10:
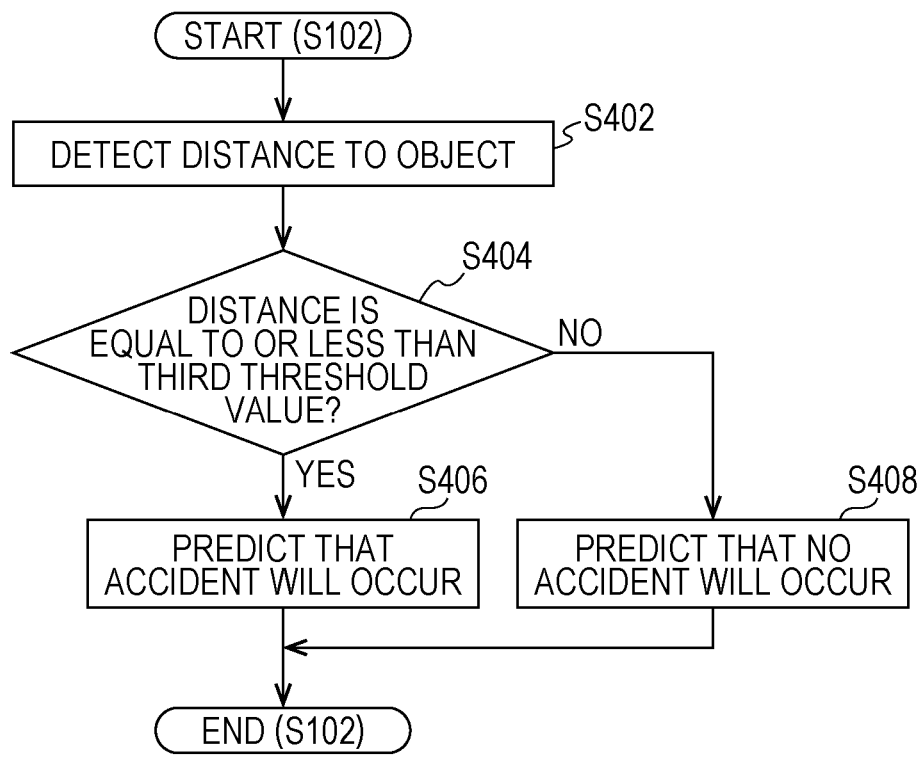
FIG. 10 is a flow chart illustrating an example of a process with which a first determination unit determines the status of a moving body, according to a third modification example.

Next, a third modification example of the aforementioned embodiment will be described. FIG. 10 is a flow chart illustrating an example of a process with which the first determination unit 120 predicts whether or not any of accidents will occur to a moving body 1, according to the third modification example of the embodiment of the present invention. More specifically, FIG. 10 is a flow chart illustrating details of the process (S102 in FIG. 5) illustrated in FIG. 5 according to the aforementioned embodiment.

As illustrated in FIG. 10, the first determination unit 120 detects the distance between the moving body 1 and an object (S402). Namely, the first determination unit 120 has the function of detecting the distance between the moving body 1 and an object ahead of the moving body 1 and, thus, is adapted to detect this distance. Also, the moving body 1 or the discharge control device 100 may include a camera or a distance sensor, such that the first determination unit 120 acquire information about this distance from this camera or distance sensor.

Further, the first determination unit 120 determines whether or not the detected distance is equal to or less than a predetermined third threshold value (S404). The third threshold value has been properly set according to usage states of the moving body 1 and, further, has been preliminarily written and stored in the control data 171 in the storage unit 170. More specifically, the third threshold value is set to be the value of a distance which is expected to cause the moving body 1 to collide with the object in the current state.

The third threshold value is preferably set to be a larger value, in order to start discharge in the energy storage devices 210 in an earlier stage, more certainly. The first determination unit 120 can be adapted to acquire this third threshold value, by calculating the third threshold value based on a predetermined rule, rather than by acquiring the third threshold value out of the control data 171.

If the first determination unit 120 determines that the detected distance is equal to or less than the third threshold value (Yes in S404), it predicts that an accident will occur to the moving body 1 (S406).

If the first determination unit 120 determines that the detected distance is not equal to or less than the third threshold value (No in S404), it predicts that no accident will occur to the moving body 1 (S408).

As described above, the process with which the first determination unit 120 predicts whether or not any of accidents will occur to the moving body 1 (S102 in FIG. 5) is completed.

As described above, the discharge control device 100 according to the third modification example of the embodiment of the present invention is adapted to predict that an accident will occur to the moving body 1, if it determines that the distance to the object is equal to or less than the predetermined third threshold value. Namely, when this distance is equal to or less than the third threshold value, the discharge control device 100 can determine that the moving body 1 is being just before colliding with the object. Therefore, the discharge control device 100 can sense the possibility of the occurrence of an accident to the moving body 1, in advance. As described above, the discharge control device 100 can predict whether or not an accident will occur to the moving body 1, by comparing this distance with the third threshold value. Therefore, the discharge control device 100 can easily suppress the overheating in the energy storage devices 210.

(Fourth Modification Example)

Figure 11:
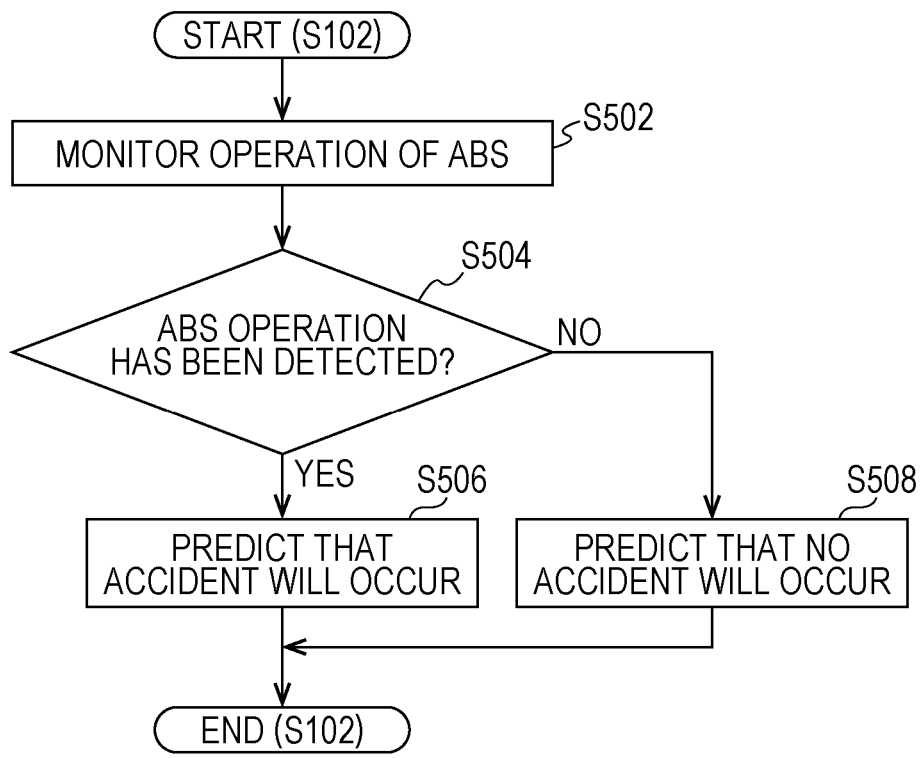
FIG. 11 is a flow chart illustrating an example of a process with which a first determination unit determines the status of a moving body, according to a fourth modification example.

Next, a fourth modification example of the aforementioned embodiment will be described. FIG. 11 is a flow chart illustrating an example of a process with which the first determination unit 120 predicts whether or not any of accidents will occur to a moving body 1, according to the fourth modification example of the embodiment of the present invention. More specifically, FIG. 11 is a flow chart illustrating details of the process (S102 in FIG. 5) illustrated in FIG. 5 according to the aforementioned embodiment.

As illustrated in FIG. 11, the first determination unit 120 monitors operations of an ABS (Antilock Brake System) in the moving body 1 (S502). More specifically, the first determination unit 120 monitors operations of an ABS function which is incorporated in the moving body 1.

The first determination unit 120 determines whether or not it has detected an operation of the ABS (S504).

If the first determination unit 120 determines that it has detected an operation of the ABS (Yes in S504), the first determination unit 120 predicts that an accident will occur to the moving body 1 (S506).

If the first determination unit 120 determines that it has detected no operation of the ABS (No in S504), the first determination unit 120 predicts that no accident will occur to the moving body 1 (S508).

As described above, the process with which the first determination unit 120 predicts whether or not any of accidents will occur to the moving body 1 (S102 in FIG. 5) is completed.

As described above, the discharge control device 100 according to the fourth modification example of the embodiment of the present invention is adapted to predict that an accident will occur to the moving body 1, if the first determination unit 120 detects an operation of the ABS in the moving body 1. Namely, when this ABS has operated, it is predicted that an accident such as a collision of the moving body 1 with an object will occur. Therefore, the discharge control device 100 can sense the possibility of the occurrence of an accident to the moving body 1 in advance. As described above, the discharge control device 100 can predict whether or not an accident will occur to the moving body 1, by detecting operations of the ABS. Therefore, the discharge control device 100 can easily suppress the overheating in the energy storage devices 210.

Although there is described the moving body 1 and the discharge control device according to embodiments of the present invention and examples of modifications thereof, the present invention is not limited to these embodiments and the examples of modifications thereof. Namely, the embodiments and the examples of modifications which have been disclosed herein are to be considered in all respects only as illustrative and not as restrictive. The scope of the present invention is indicated by the claims rather than by the above description and is intended to embrace all changes that fall within the meaning and range of equivalents to the claims.

For example, in the aforementioned embodiment and in the examples of modifications thereof, in cases where it is determined that no accident has occurred to the moving body 1 after the start of discharge in the energy storage devices 210, the discharge controller 160 stops the discharge in the energy storage devices 210. However, the discharge controller 160 can be also adapted to continue the discharge in the energy storage devices 210, in view of the safety, even in such cases.

Further, the scope of the present invention is also intended to embrace modes which are formed by arbitrarily combining the aforementioned embodiments and the aforementioned examples of modifications. For example, it is also possible to provide structures formed by applying other examples of modifications to the aforementioned first modification example, or structures formed by applying other examples of modifications to the aforementioned second modification example.

In the above embodiments and in the above examples of modifications, the discharge control device is applied to an energy storage system incorporated in a moving body. The discharge control device can be also applied to a stationary energy storage system, such as an emergency power supply device.

Further, the present invention can be realized not only as the moving body 1 and the discharge control device, but also as a discharge control method including steps of characteristic processes to be performed by the discharge control device.

Figure 12:
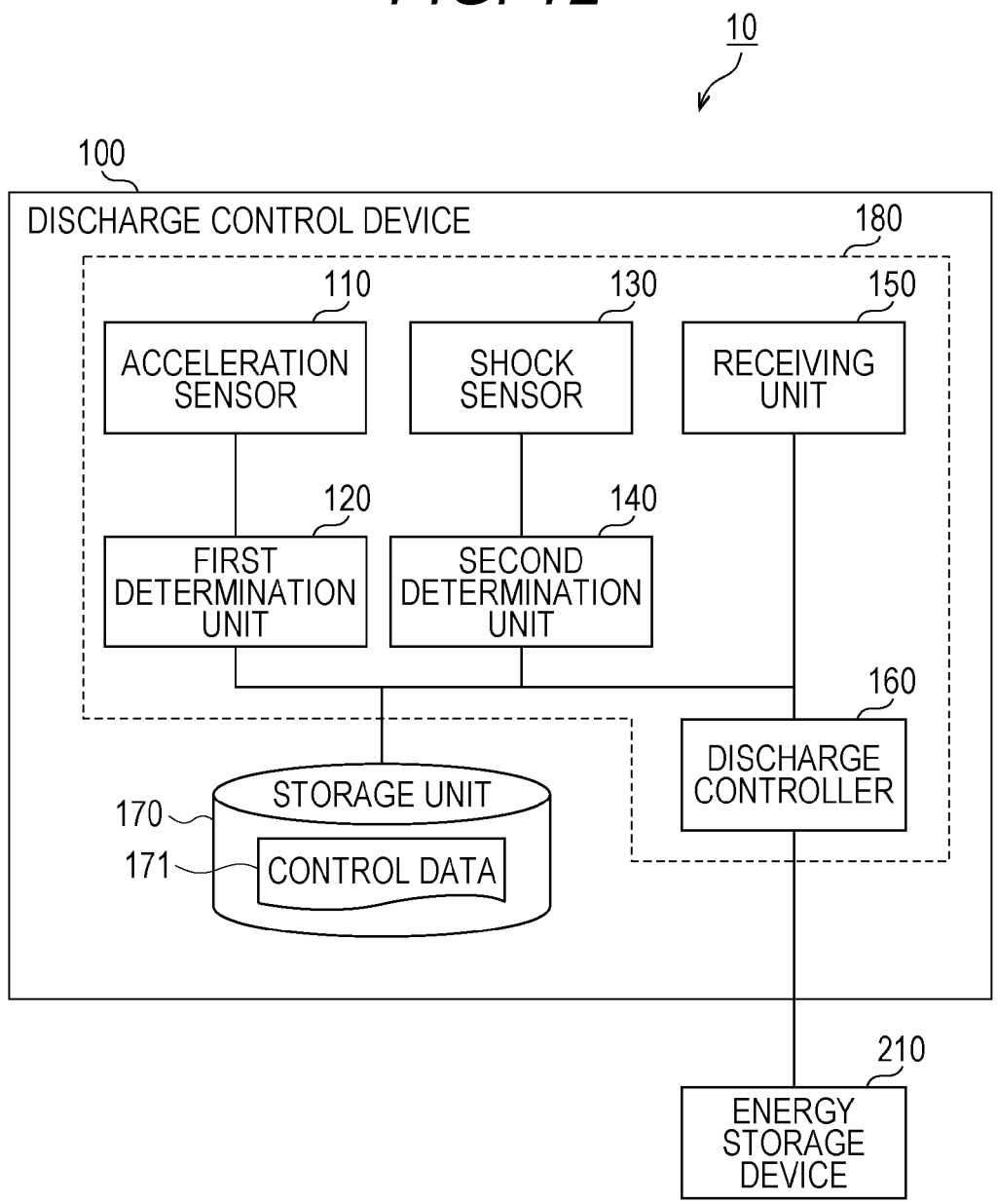
FIG. 12 is a block diagram illustrating a structure which realizes the discharge control device according to the embodiment of the present invention with an integrated circuit.

The respective processing units included in the discharge control device according to the present invention can also be realized through an LSI (Large Scale Integration) as an integrated circuit. For example, as illustrated in FIG. 12, the present invention can be realized as an integrated circuit 180 including an acceleration sensor 110, a first determination unit 120, a shock sensor 130, a second determination unit 140, a receiving unit 150, and a discharge controller 160. FIG. 12 is a block diagram illustrating a structure which realizes the discharge control device according to the embodiment of the present invention with an integrated circuit.

Also, the processing units included in the integrated circuit can be each individually formed by a single chip or can be partially or entirely formed by a single chip. In this case, it is referred to as an LSI, but can be also referred to as an IC, a system LSI, a super LSI, an ultra LSI, depending on the difference in degree of integration among them.

Further, the scheme for forming them as such an integrated circuit is not limited to LSIs and can be also realized by dedicated circuits or general-purpose processors. It is also possible to employ FPGAs (Field Programmable Gate Arrays) which can be programmed after the fabrication of such LSIs or re-configurable processors which are capable of reconfigurations of connections and settings in circuit cells inside such LSIs.

Furthermore, if techniques for realizing them as integrated circuits, which can be substituted for LSIs, appear, due to advancement of semiconductor techniques or other techniques derived therefrom, it is also possible to integrate the functional blocks utilizing such techniques, as a matter of course. There is a possibility of application of biotechnologies thereto.

Also, the present invention can be realized as programs which cause a computer to execute characteristic processes included in the discharge control method. Also, the present invention can be realized as non-transitory computer readable recording media which store these programs, such as flexible discs, hard discs, CD-ROMs, MOs, DVDs, DVD-ROMs, DVD-RAMs, BDs (Blu-ray (trademark) Discs), semiconductor memories. Further, it goes without saying that such programs can be distributed through recording media such as CD-ROMs and transfer media such as the Internet.

The present invention can be applied to discharge control devices and the like which can suppress overheating in energy storage devices, such as lithium ion secondary batteries.

What is claimed is:

1. A discharge control device for controlling discharge in a secondary battery disposed in a vehicle, comprising:
   a first determination unit adapted to determine whether or not a vehicle's status is outside a predetermined first range;
   a discharge controller adapted to start discharge in the secondary battery, when the first determination unit determines that the vehicle's status is outside the first range;
   wherein the secondary battery is incorporated in the vehicle which is supplied with electric power from the secondary battery, and the first determination unit is adapted to determine a status of the vehicle, by detecting an acceleration of the vehicle; and
   wherein the first determination unit is adapted to determine that the status of the vehicle is outside the first range, when the acceleration of the vehicle is equal to or less than a predetermined first threshold value below zero.

2. The discharge control device according to claim 1, further comprising a second determination unit adapted to determine whether or not the vehicle's status is within a predetermined second range, after the discharge controller starts the discharge in the secondary battery,
   wherein the discharge controller is adapted to stop the discharge in the secondary battery, when the second determination unit determines that the vehicle's status is within the second range.

3. The discharge control device according to claim 1, further comprising
   a receiving unit adapted to receive a discharge stop command which is a command for stopping discharge in the secondary battery,
   wherein the discharge controller is adapted to stop the discharge in the secondary battery, when the discharge stop command has been received after the start of the discharge in the secondary battery.

4. The discharge control device according to claim 1, wherein the predetermined first threshold value is set to fall within the range of −2G to −0.7G.

5. The discharge control device according to claim 1, further comprising an acceleration sensor adapted to detect the acceleration of the vehicle.

6. The discharge control device according to claim 2, wherein the second determination unit is adapted to determine the vehicle's status, by detecting a degree of a shock.

7. The discharge control device according to claim 6, wherein the second determination unit is adapted to determine that the vehicle's status is within the second range, when the degree of the shock is less than a predetermined second threshold value.

8. The discharge control device according to claim 6, wherein the secondary battery is incorporated in the vehicle which is supplied with electric power from the secondary battery, and the shock is a shock exerted on the vehicle.

9. The discharge control device according to claim 6, further comprising a shock sensor adapted to detect the degree of the shock.

10. An energy storage system comprising:
a secondary battery; and
the discharge control device according to claim 1 for controlling discharge in the secondary battery.

11. The energy storage system according to claim 10, wherein
the secondary battery comprises a nonaqueous electrolyte secondary battery.

12. A moving body comprising the energy storage system according to claim 10.

13. The discharge control device according to claim 1, wherein
the secondary battery is incorporated in the vehicle which is supplied with electric power from the secondary battery, and
the vehicle's status is at least one of an acceleration of the vehicle, a distance between the vehicle and an object ahead of the vehicle, and an operation of an antilock brake system in the vehicle.

14. A discharge control method with which a computer controls discharge in a secondary battery disposed in a vehicle, comprising:
determining whether or not the vehicle's status is outside a predetermined first range;
starting discharge in the secondary battery, when the determining determines that the vehicle's status is outside the first range;
wherein the secondary battery is incorporated in the vehicle which is supplied with electric power from the secondary battery, and the first determination unit is adapted to determine a status of the vehicle, by detecting an acceleration of the vehicle; and
wherein the first determination unit is adapted to determine that the status of the vehicle is outside the first range, when the acceleration of the vehicle is equal to or less than a predetermined first threshold value below zero.

15. A non-transitory computer readable medium which stores a computer command for executing the discharge control method according to claim 14.

16. The discharge control method according to claim 14, wherein
the secondary battery is incorporated in the vehicle which is supplied with electric power from the secondary battery, and
the vehicle's status is at least one of an acceleration of the vehicle, a distance between the vehicle and an object ahead of the vehicle, and an operation of an antilock brake system in the vehicle.

17. A discharge control device for controlling discharge in an energy storage device disposed in an electric apparatus, comprising:
a first determination unit adapted to determine whether or not an electric apparatus's status is outside a predetermined first range and predict that an accident will occur to the electric apparatus when the electric apparatus's status is outside the predetermined first range; and
a discharge controller adapted to start discharge in the energy storage device prior to an actual occurrence of the accident, when the first determination unit predicts that the accident will occur to the electric apparatus.

18. A discharge control method with which a computer controls discharge in an energy storage device disposed in an electric apparatus, comprising:
determining whether or not an electric apparatus's status is outside a predetermined first range;
predicting that an accident will occur to the electric apparatus when the electric apparatus's status is outside the predetermined first range; and
starting discharge in the energy storage device prior to an actual occurrence of the accident, when the accident is predicted to be occurred to the electric apparatus.

* * * * *